N. C. PELLISSERO.
RESILIENT TIRE.
APPLICATION FILED APR. 24, 1918.
1,297,902.
Patented Mar. 18, 1919.
2 SHEETS—SHEET 1.
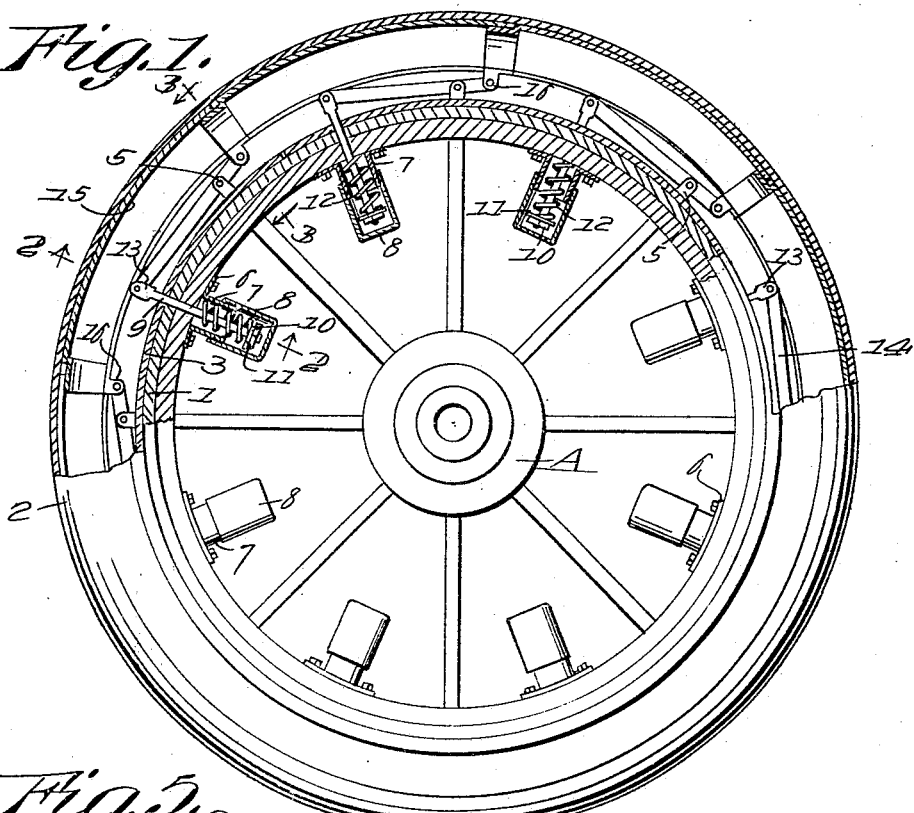
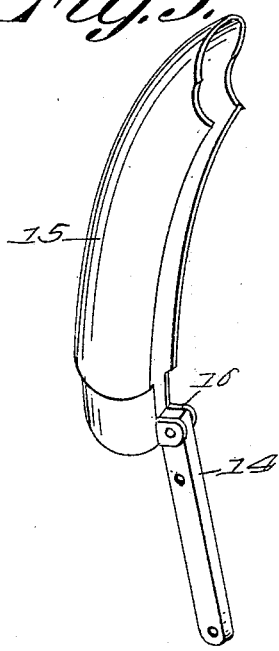
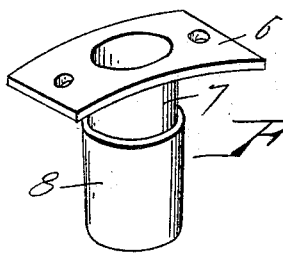
Inventor
N. C. Pellissero,
By
Attorney N. C. PELLISSERO.
RESILIENT TIRE.
APPLICATION FILED APR. 24, 1918.
1,297,902.
Patented Mar. 18, 1919.
2 SHEETS—SHEET 2.
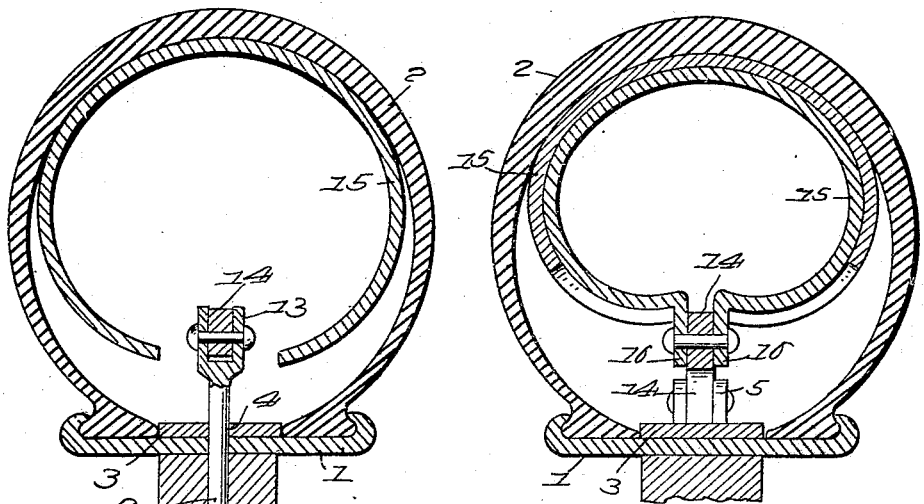
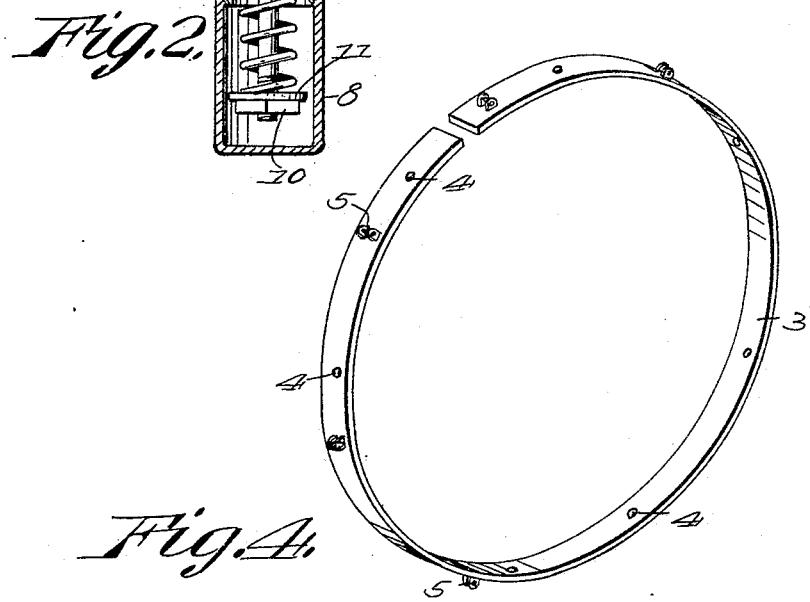
Inventor
N. C. Pellissero,

UNITED STATES PATENT OFFICE.

NICHOLAS C. PELLISSERO, OF SCAMMON, KANSAS, ASSIGNOR OF ONE-FIFTH TO AI LUCKEY, OF COLUMBUS, KANSAS.

RESILIENT TIRE.

1,297,902.  Specification of Letters Patent.  Patented Mar. 18, 1919.

Application filed April 24, 1918. Serial No. 230,462.

*To all whom it may concern:*

Be it known that I, NICHOLAS C. PELLISSERO, a citizen of the United States, residing at Scammon, in the county of Cherokee and State of Kansas, have invented new and useful Improvements in Resilient Tires, of which the following is a specification.

The invention is designed with the principal purpose in view of providing a sectional metallic tire to be inclosed in the usual rubber clencher tire, whereby all the benefits derived from the pneumatic tire may be had without the use of air.

A further purpose of the invention is to provide a resilient tire which may not be readily unserviceable as a result of the puncturing of the rubber covering.

A still further purpose is to provide a unique mechanical device to be inclosed by the rubber casing, the said device being so arranged that relatively small resilient members may be employed to sustain a relatively great weight.

A still further purpose is to provide a device of the kind mentioned which is simple in construction, durable and effective in operation, inexpensive to manufacture and which may be applicable to the usual tire rim and outer casing.

Still further and other purposes will appear as the invention is set forth in detail in the description which follows:

To the exact embodiment to which it is shown and described, the invention is not to be restricted. The actual reduction to practice may suggest certain desirable changes or alterations and the right is claimed to make any which do not deviate from the scope of the subjoined claims.

In the accompanying drawings:

Figure 1 is a view partly in side elevation and partly in section showing the application of the invention, Fig. 2 is a section on the line 2—2 of Fig. 1, Fig. 3 is a section on the line 3—3 of Fig. 1, Fig. 4 is a perspective view of the supplementary rim, Fig. 5 is a perspective view of one of the plate members and its attendant lever.

Fig. 6 is a perspective view of the casing used to inclose the spring member of each section.

Referring to the drawings, there is shown a wheel A on the felly of which is carried, the usual form of clencher rim 1, the tire casing 2 being attached to the clencher rim in the usual way.

The invention comprises mechanical devices to be carried within the tire casing 2. To provide for the attachment of the invention, the felly and the clencher rim 1 are provided with holes medially positioned between the spokes of the wheel A and formed in alinement with the radius of the wheel. These holes obtain at the center of the transverse dimension of the felly. A supplementary rim 3 is designed to be carried on the felly on top of the clencher rim 1 and between the clencher flanges of the latter. This rim 3 is split transversely to permit its easy attachment over the clencher flanges of the rim 1. The supplementary rim is provided with holes 4 which register with the holes previously referred to as being formed in the felly and is further provided with integral ears 5 arranged in pairs, the individual units of which stand in spaced relation to each other. Each pair of ears 5 has a position substantially central to each pair of adjacent holes 4.

On the inside there is attached, to the felly, housing members for springs later described, each housing member comprising a base plate 6 which is secured to the felly by appropriate screws or bolts. Integrally connected with the base plate 6, there is a relatively short tubular member 7 which is threaded externally to permit its receiving the cap member 8, which is closed at that end opposite to the one on which the threads are formed.

Passing slidably through the holes 4 and through holes in the felly there are rod members 9 which are provided with appropriate threads to permit them receiving each on one end, a nut 10 and washer 11. In surrounding relation to each rod member 9 there is a helical spring 12 which is compressed between the washer 11 and the inner periphery of the felly.

Each of the rod members 9 is provided with a bifurcated end 13, between the legs of which one end of a lever 14 is pivotally attached. This lever 14 is pivotally mounted between the two ears 5 of one pair, the lever having its shorter arm pivotally connected to a plate member 15. The plate member 15 is made arcuate in cross section and arcuate in length, both these arcuate formations conforming to the shape of the tire casing 2 on the interior of the latter. The plates 15 do not, however, contact with all the interior surface of the casing, for their longitudinal edges terminate at substantially the middle of the height of the casing. At one end, the plates are provided with ears 16 between which, one end of the lever 14 stands, and by means of which pivotal connection is effected between the lever and the plates through the instrumentality of an appropriate pivot stud. At the end opposite from the ears 16, each plate overlaps the pivotally connected end of its neighbor. Thus each plate is forced up against the tread section of the tire casing 2 by its own lever 14 and spring 12 connected therewith and the lever and spring of the neighboring section.

It will be observed that the peculiar construction provides for maintaining all the sections in close contact with the tire casing on the inside, thus tending to keep the casing in its normal shape, such as would result were an air filled inner tube employed. The construction also provides for the yielding of the tire, since undue force applied on any one section will cause it to depress the shorter arm of its lever 14 and raise the longer arm against the pressure of its spring 12, the overlapping end of the section so operated depressing the adjacent section to cause the latter to operate its lever and spring in a similar manner.

The arrangement of having the shorter arms of the levers 14 connected to the plate members and the longer arms operated upon by the spring members, provides for the use of springs whose strength is not nearly so much as would be necessary were the springs called upon to sustain the plate members directly upon themselves.

The provision of the nuts 10 makes possible an adjustment that permits the variation of the force exerted by the springs. Also the provision of the cap members 8 provides for appropriately inclosing the springs except when it is necessary to effect adjustments or to replace or repair damaged springs.

From the foregoing description and the accompanying drawings, the operation and advantages of the invention are so apparent that further description is omitted.

The invention having been described, what is claimed as new and useful is:

1. The combination with a wheel having a clencher rim and a tire casing engaged and held on by said rim, of a plurality of overlapping plates conforming both in transverse and longitudinal outline with the tire casing, said plates being carried within the casing, a lever pivotally connected with each plate and fulcrumed upon the wheel, and a spring connected with each lever, so that the spring and plate connected with each lever may be joined with the longer and shorter arm thereof respectively.

2. The combination with a wheel having a clencher rim and a tire casing engaged and held on by said rim, of a plurality of overlapping plates conforming both in transverse and longitudinal outline with the tire casing, said plates being carried within the casing, springs carried on the inside of the felly of the wheel, connections between each spring and one end of each plate, whereby the springs indirectly sustain the weight imposed upon the wheel and thereby are permitted to sustain a greater weight than if they were under direct pressure, and casings carried on the felly and inclosing the springs, the casings having removable caps.

3. The combination with a wheel having a clencher rim and a tire casing engaged and held on by said rim, of a plurality of overlapping plates conforming in transverse and longitudinal outline with the tire casing, said plates being carried within the casing, a lever pivotally connected with each plate and fulcrumed upon the wheel, rod members passing radially through the felly of the wheel and each having pivotal connection with one of the levers, a nut threaded upon the inner end of each rod member, and a spiral spring in surrounding relation to each rod member and compressed between the inner face of the felly of the wheel and the nut.

4. The combination with a wheel having a clencher rim and a tire casing engaged and held on by said rim, of a plurality of overlapping plates conforming in transverse and longitudinal outline with the tire casing, said plates being carried within the casing, a supplemental rim carried by the wheel and between the flanges of the clencher rim, a lever pivotally connected with each plate and fulcrumed upon the supplemental rim, rod members passing radially through the supplemental rim and through the felly of the wheel, and each having pivotal connection with one of the levers, a nut threaded upon the inner end of each rod member, and a spiral spring in surrounding relation to each rod member and compressed between the inner face of the felly of the wheel and the nut.

5. The combination with a wheel having a tire casing carried thereby, of a plurality of overlapping plates conforming both in transverse and longitudinal outline with the tire casing, said plates being carried within the casing, resilient members carried by the wheel, and connections between each resilient member and one end of each plate whereby the said resilient members indirectly sustain the weight imposed upon the wheel and thereby are permitted to sustain a greater weight than if they were under direct pressure.

In testimony whereof I affix my signature.

NICHOLAS C. PELLISSERO.

Copies of this patent may be obtained for five cents each, by addressing the "Commissioner of Patents, Washington, D. C."